(12) United States Patent
Zerfus

(10) Patent No.: US 10,164,676 B2
(45) Date of Patent: Dec. 25, 2018

(54) ELECTRONIC DEVICE CASE

(71) Applicant: Elena R. Zerfus, New Castle, DE (US)

(72) Inventor: Elena R. Zerfus, New Castle, DE (US)

( * ) Notice: Subject to any disclaimer, the term of this patent is extended or adjusted under 35 U.S.C. 154(b) by 112 days.

(21) Appl. No.: 15/053,258

(22) Filed: Feb. 25, 2016

(65) Prior Publication Data
US 2016/0242531 A1     Aug. 25, 2016

Related U.S. Application Data

(60) Provisional application No. 62/120,652, filed on Feb. 25, 2015.

(51) Int. Cl.
*A45F 5/00* (2006.01)
*H04B 1/3827* (2015.01)
*H04M 1/04* (2006.01)

(52) U.S. Cl.
CPC ............... *H04B 1/385* (2013.01); *A45F 5/00* (2013.01); *A45F 2005/008* (2013.01); *A45F 2200/0516* (2013.01); *H04B 2001/3855* (2013.01); *H04B 2001/3861* (2013.01); *H04M 1/04* (2013.01)

(58) Field of Classification Search
CPC .................. A45F 5/00; A45F 2005/008; A45F 2200/0516; H04B 1/385; H04B 2001/3855; H04B 2001/3861; H04B 1/04

USPC ................................................ 224/219, 221
See application file for complete search history.

(56) References Cited

U.S. PATENT DOCUMENTS

| 4,500,019 | A | | 2/1985 | Curley, Jr. | |
|---|---|---|---|---|---|
| 4,896,805 | A | * | 1/1990 | Klaczak | G08B 3/1058 224/236 |
| 6,123,240 | A | * | 9/2000 | Fowles | A45C 1/04 224/219 |
| 7,810,683 | B2 | * | 10/2010 | Chan | A45F 5/00 224/221 |
| 8,752,740 | B2 | | 6/2014 | Morgan et al. | |
| 2004/0251285 | A1 | | 12/2004 | O'Neill | |
| 2007/0095871 | A1 | | 5/2007 | Chen | |
| 2008/0017678 | A1 | * | 1/2008 | Anderson | A44C 5/003 224/221 |
| 2012/0080462 | A1 | | 4/2012 | Hajarian | |
| 2013/0214019 | A1 | * | 8/2013 | Wu | B62J 11/00 224/413 |
| 2013/0256346 | A1 | | 10/2013 | Rohrbach et al. | |

* cited by examiner

*Primary Examiner* — Corey Skurdal

(57) ABSTRACT

An electronic device cover for use as a carrying case is described. The device can be a personal cell phone. The cover can be worn as an arm band or wristband carrying case. For example, the cell phone case/cover can have attached double bands connected from the edge of the cover flap to the bottom of the case. The flap can attach to the case through a small band attached at the top and the bottom of the cover flap.

7 Claims, 7 Drawing Sheets

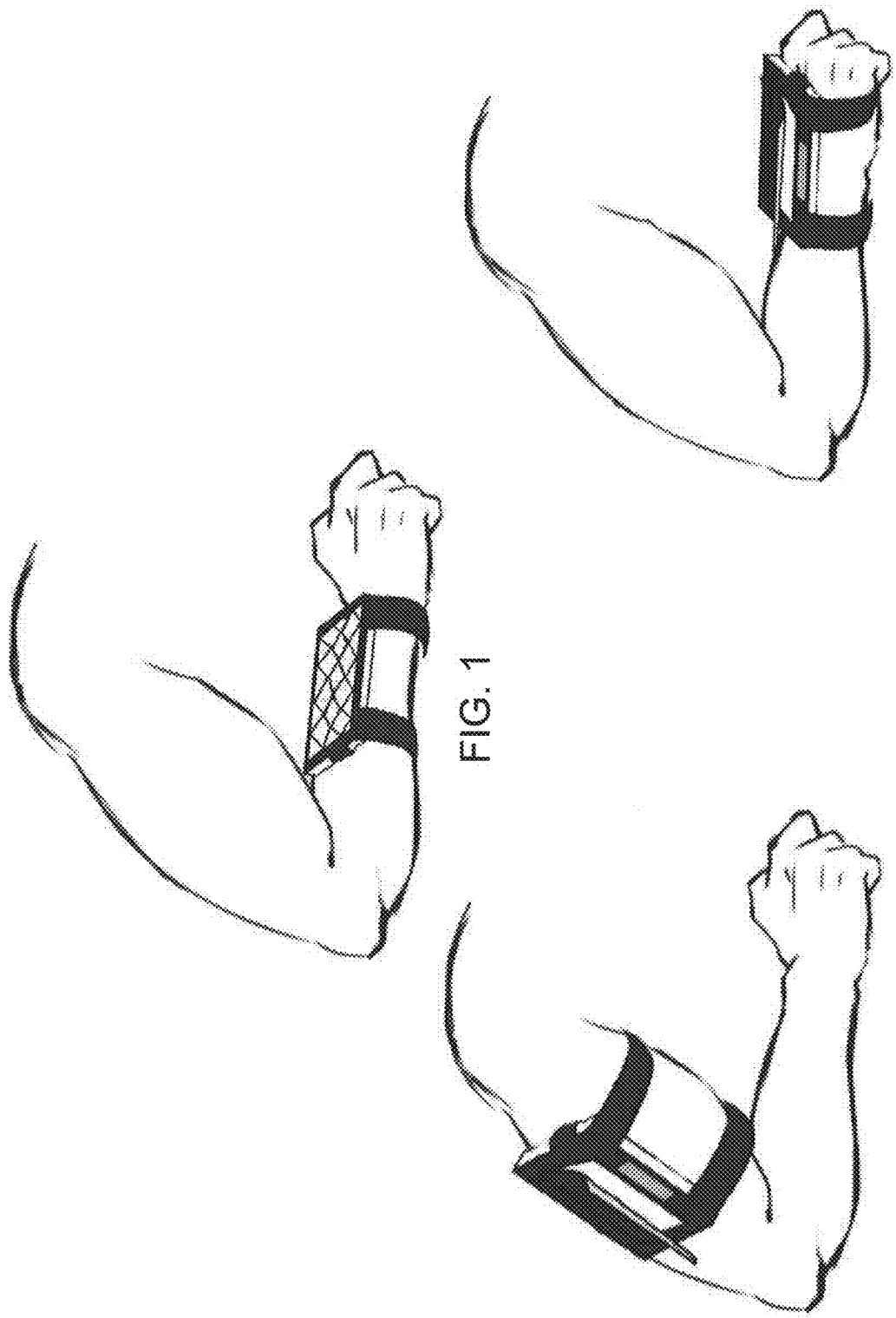

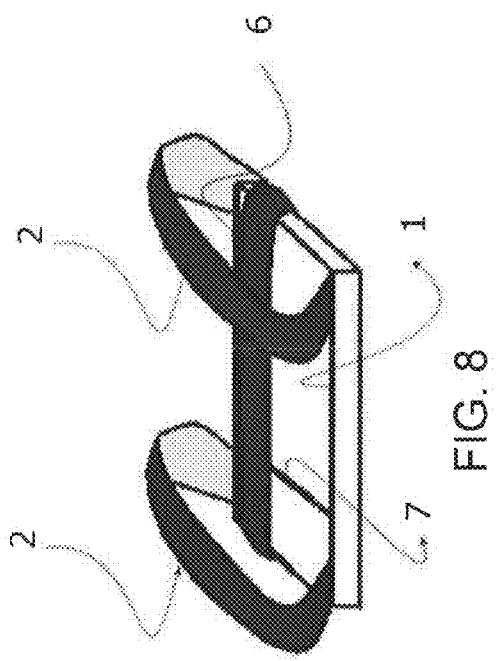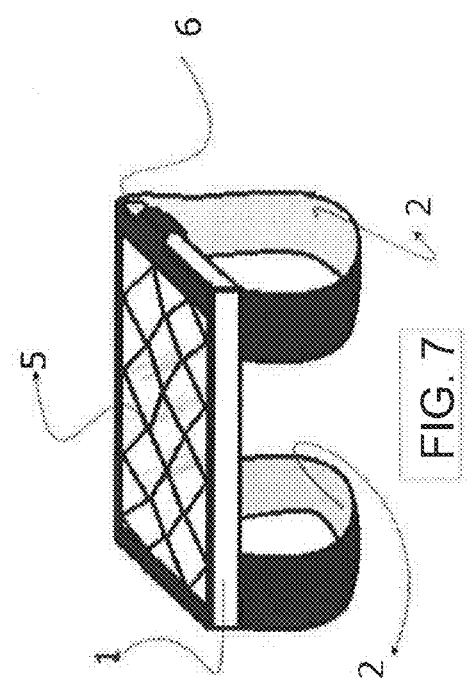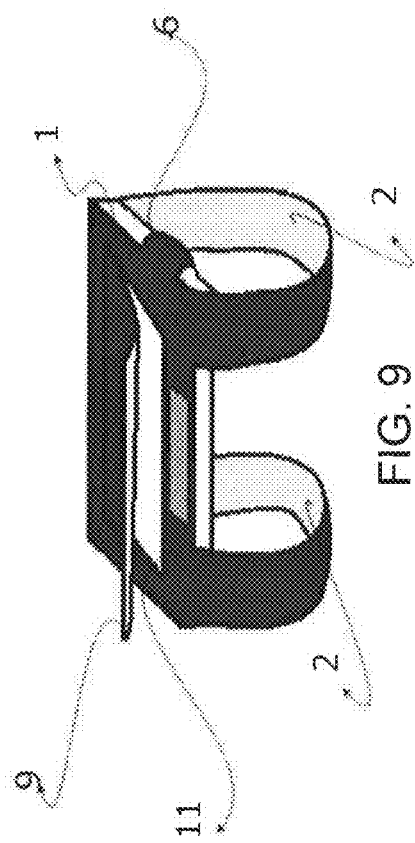

ELECTRONIC DEVICE CASE

CROSS-REFERENCE TO RELATED APPLICATIONS

This application claims priority to U.S. Provisional Patent Application No. 62/120,652 filed on Feb. 25, 2015, the contents of which are incorporated herein in their entirety.

FIELD OF THE TECHNOLOGY

The invention generally relates to electronic device carrying cases and covers, and more specifically to cell phone covers that may be attached to, or carried on, an individual's arm, wrist or the back of the hand.

BACKGROUND OF THE INVENTION

Having immediate access to an electronic device presents challenges. Many people carry their electronic devices in their hands to have easy access to them, which results in a high risk of damaging the device due to frequent drops. Arm band storage devices are an option, but many are dedicated to sports activities. Most of the existing armband carrying cases also fasten via buckles and/or Velcro®. The existing arm bands/arm/wrist bands used for storing and carrying devices remain on the arm/wrist while the contained device is removed and used, after which the device is placed back into the arm band pocket/location. Existing bands do not function for both carrying devices and covers for convenient use at the same time as storage. For example, the existing armbands/arm/wrist hands provide no easy way to access the touch screen of the phone without removing it from the arm/wrist. Representative prior art bands are described in U.S. Pat. Nos. 4,500,019; 8,752,740; US 2004/0251285; US 2007/0095871; US 2012/0080462; and US 2013/0256346, the contents of each are incorporated herein by reference in their entirety.

SUMMARY OF THE INVENTION

The present disclosure provides a cover for an electronic device, e.g., cell phone, having a cover flap and a back of the case which are connected. For example, they may be connected via 2 or more bands which are used to secure the case on the arm, wrist, or the back of the hand.

In some embodiments, the cover flap is constructed or designed of a material that allows direct access to the touch screen of the cell phone. For example, the material may be a mesh material that can allow access to the touch screen.

In another embodiment, the cover flap may be designed to secure a portion of, or substantially the entire perimeter of the device and leave a substantial portion of the touch screen accessible.

In yet another embodiment, the cover flap can be removable or opened to allow access to the touch screen. For example, the cover flap can be constructed of a material, solid or mesh, with a middle opening that is covered by an extra flap of material attached to one side of the cover. The extra flap can overlap the cover flap and he attached to, or closed, by any convention means, such as a magnet or Velcro®. Opening the extra flap gives easy access to the screen while the device is attached to the arm, wrist or the back of the hand.

BRIEF DESCRIPTION OF THE DRAWINGS

The invention will now be described in further detail, by way of example only, with reference to the accompanying drawings in which:

FIG. 1 illustrates one embodiment of a personal cell phone cover as a band carrying case device constructed in accordance with the teachings of the disclosure as being worn on the wrist;

FIG. 2 illustrates one embodiment of a personal cell phone cover as a band carrying case device constructed in accordance with the teachings of the disclosure as being worn on the arm;

FIG. 3 illustrates one embodiment of a personal cell phone cover as a band carrying case device constructed in accordance with the teachings of the disclosure as being worn on the back of the hand;

FIG. 7 illustrates a front and side perspective view of the personal cell phone cover as a band carrying case device with the cover flap closed and the case fastened of the personal armband storage device of FIG. 1;

FIG. 8 illustrates a back perspective view of the personal cell phone cover as a band carrying case device with the cover flap closed and cover flap fastened of the personal armband storage device of FIG. 1; and FIG. 9 illustrates a front perspective view of the personal cell phone cover as a band carrying case device with the cover flap closed and case fastened of the personal armband storage device of FIG. 1 with an additional flap for screen access.

DETAILED DESCRIPTION OF INVENTION

Figure 5:
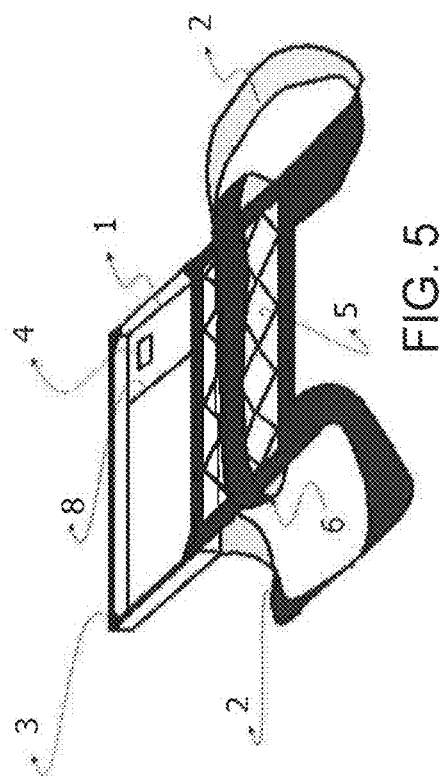
FIG. 5 illustrates a front perspective view with the cover flap opened of the personal cell phone cover as a band carrying case device of FIG. 1.

The invention relates to electronic device carrying cases and covers, and more specifically to cell phone covers that may be attached to, or carried on, an individual's arm, wrist or the back of the hand.

Some embodiments of the present invention provide a case with a cover flap, at least two bands connecting the flap, e.g., an edge of the flap, to case, e.g., the bottom of the case and a cover flap fastening band connecting on the inside of the cover flap the two other edge of the cover flap.

The case can be any casing designed to hold or contain an electronic device. The case can allow access to the electronic device, such as a camera or a camera function of the device, e.g., lens. The case can be made of any material, such as metal, plastic or combinations thereof. The case can have a back wall arid up to four side walls and capable of being open towards the front. In some embodiments, the case has up to four corner stoppers on the open side of the case. The long length of the ease can be the side of the case that is parallel with the arm/wrist when is attached to the arm/wrist. The short length of the case can be perpendicular to the arm/wrist. Preferably, the case is made out of flexible elastic material, e.g., fabric that can fit the device or can fit over the device on top of a hard cover. The case can mold to, or fit tightly on, the electronic device with one open side for operation of the device touch screen, The thickness of the cover flap, case, or both can be between about 1, 2, 3, 4 or about 5 mm. These values can define a range, such as about 2 to about 4 mm. The thickness of the material can be designed to minimize the bulkiness of the device when worn on the wrist and maximize the strength of the case. The thickness of the material should he sufficient to avoid the case tearing while sliding on and off the wrist. The material used to make the case can be a soft weaved cotton, which can be water sealed with rubber cement. The cotton can reduce the heat retention of the device and the rubber cement protects the device from body moisture.

The case can have attachment points for the arm/wrist bands to connect to it. The case can have slits, weaved or sewn connections designed to secure or loop through the bands. In one embodiment the attachment points are on the back of the case. In another embodiment, the attachment points are on the back and one side wall of the case. The attachment points for the bands on the case are at an angle to the long length of the case. Preferred attachment angle of the bands are at about 60, 65, 70, 75, 80, 85, 90, 95, 100, 105, 110, 115 or about 120 degrees from the long length of the case.

The cover flap can be designed to allow access to the face of an electronic device held within the case. The cover flap can be attached on one side to the case on the long length. In another embodiment the cover flap can extend to the back of the case and the back wall of the case can be attached to the cover flap by Velcro® where the case is detachable in this case. The other three sides of the cover Clap can be unattached and make the open side of the cover flap. The back of the cover flap can be towards the case, the front of the cover flap can be towards the outside of the device. The long length of the cover flap can be parallel with the wrist/arm when the device is attached on the user's arm/wrist. The short length of the cover flap can be perpendicular to the arm wrist.

In some embodiments, cover flap can include a mesh material such that the user can access the touch screen of the device. The cover flap mesh can be designed to allow the user to touch the screen through the mesh openings and be able to unlock the device or answer the phone. The shape of the mesh openings can be a polygonal shape including a square, a rectangle, a diamond, a pentagonal shape or a hexagonal shape, or a circular shape and may be disposed regularly. The size of the mesh openings can be about 1, 2, 3, 4, 5, 6, 7, 8, 9, 10, 11, 12, 13, 14, 15, 16, 17, 18, 19, 20, 31, 32, 33, 34, 35, 36, 37, 38, 39, 40, 41, 42, 43, 44, 45, 46, 47, 48, 49 or about 50 mm$^2$. The thickness of the mesh strands can range from about 0.5, 0.6, 0.7, 0.8, 0.9, 1, 2, 3, 4, 5, 6, 7, 8, 9 or about 10 mm. These sets of value can be used to define a range, such as openings from about 5 to about 20 mm$^2$, or strands from about 1 mm to about 10 mm.

The cover flap has attachment points for the arm/wrist bands to connect to it. The cover flap can have slits, weaved or sewn connections designed to secure or loop through the bands. In one embodiment the attachment points are on the back of the cover flap. In another embodiment, the attachment points are on the front of the cover flap. In another embodiment, the attachment points are on the edge of the cover flap. A preferred attachment point area can start on the front side of the flap and end at the open edge of the cover flap. The attachment points can be at an angle to the long length of the cover flap on the open side (e.g., 0 to 180 deg). Preferred attachment angles for the bands on the cover flap include about 60, 65, 70, 75, 80, 85, 90, 95, 100, 105, 110, 115 or about 120 degrees to the long length of the cover flap. Preferred attachment position at the cover flap is at the long length ends to maximize the coverage of closure for the open side of the case with the cover flap.

The cover flap has attachment points for the fastening bands to connect to it, The cover flap can have slits, weaved or sewn connections designed to secure or loop through the bands. In one embodiment the attachment points are on the back of the cover flap. In another embodiment, the attachment points are on the front of the cover flap. A preferred attachment point area can start on the front side of the flap and end at the open edge of the short length of the cover flap. A preferred attachment location of the bands on the cover flap is from one open short length to the other open short length of the cover flap making a loop trough the back of the cover flap. Attachment points on the short length of the cover flap can range from 1 mm to 60% of the short length size of the case from the attached side of the cover flap. Short length of the case can range from 5 mm to 150 mm. The 150 mm is estimated to be about 2 wrist diameters of the large size wrist. A preferred position is at the middle of the short length of the cover flap in order to maximize the coverage of closure for the open side of the case with the cover flap.

One or more bands can be connected to the case on one side and to the cover flap on the other side. The bands can be designed to fit around a user's arm, wrist or back of the hand. The bands can be constructed of an elastic fabric and designed so that it fits the arm or wrist of a user, but also allows the device to slide off the arm, wrist or hand with little effort. In one embodiment when the cover flap extends under the back of the case and the case can be detachable the arm/wrist bands are connected on the cover flap on both ends, the wrist/arm band connection points on the case side is in the same location that would be on the case but since the cover flap extends under the case they will connect to the cover flap extension that is attached to the back of the case.

The arm/wrist bands can be designed to reverse positions. They can be positioned to hold the case with the bottom wall towards the wrist, arm, back of the hand. For example, the cover flap can be visible while wearing it on the wrist, arm, or the back of the hand but not able to open. The reversed position of the arm/wrist bands can be towards the open side of the case towards the front of the cover flap. The back wall of the case can be exposed and the cover flap faces towards the wrist when attached to the arm/wrist. In this position the cover flap fastening band can un-wrap from the case and the cover flap can open.

Attachment points of the bands on the case and the cover flap depend on the length of the case and the length of the bands. Length of the bands can be based on the wrist size small, medium, large. The bands can be attached on the case at a different distance then the cover flap attachment points. The arm/wrist bands length and position can he designed to allow the reversal from the position towards the bottom of the case towards the front side of the cover flap and vice-versa in order that the cover flap can open and allow full access to the case opening.

The long length of the case and arm/wrist size can determine the attachment point positions for the arm/wrist bands. The length of the hands at highest stretch point can be bigger then the perimeter of the case encompassed by the arm/wrist bands attachment points when the cover flap is closed.

The bands can also be adjustable. The length of the bands that secure to the user can be adjusted by up to 10%, 20%, 30%, 40%, or about 50%. The main adjustment system is stretch material. A secondary adjusting system can be added. In some cases Velcro® or buckles can be used to extra adjust the length of the bands for creating a better fit when changing from a small wrist to a wide arm circumference.

The case can also have cover flap fastening bands. The cover flap can close and fasten to the case via at least one band that connects the two open short length sides of the cover flap through the back of the cover flap wherein the band is designed to fit around the case to fasten the cover flap to the case. The bands can he constructed of an elastic fabric. The band width can range from 1 mm to 20% of the case short length. Short length of the case can range from 5 mm to 150 mm, The length can be about 5, 10, 15, 20, 25, 30, 35, 40, 45, 50, 55, 60, 65, 70, 75, 80, 85, 90, 95, 100, 105, 110, 115, 120, 125, 130, 135, 140, 140 or about 150 mm. These values can be used to define a range, such as about 2 to about 100 mm. The 150 mm is about 2 wrist diameters of the large size wrist. The length of a cover flap fastening band at its highest stretch point can be bigger then the perimeter of the case that is encompassed by the two attachment points of the cover flap fastening band when the cover flap is closed. The length of a cover flap fastening band at its lowest stretch point can be the perimeter of a section of the case view towards the long length and the side wall.

In some embodiments, the cover flap includes a material that is transparent or of sufficiently small aggregate volume such that the user can see the device screen with little or no interference. In some embodiments, the cover flap is designed to secure a portion of, or substantially the entire perimeter of the device and leave a substantial portion of the touch screen accessible.

In some embodiments, the cover flap is removable or can be opened to allow access to the touch screen. For example, the cover flap can be constructed of a solid or mesh material. It can also have a middle opening that can be optionally covered by an extra flap of solid material attached to one side of the cover. The extra flap, which can overlap the cover flap, can be attached to, or closed, by any convention means, such as to close via a magnet or Velcro®. Opening the extra flap can give easy access to the screen while the device is attached to the wrist or the back of the hand. The extra flap area can range from 40% to 80% the size of the cover flap.

In some embodiments the cover flap can extend under the case for the full surface of the back wall of the case. The case is attached to the cover flap and it can be attached via Velcro® or sewn or glued.

In some embodiments, the cover/case further can include a pocket capable of storing a credit card wherein the pocket is located on the outside back or the inside back of the cover/case. The pocket area size can range from 60% to 80% the size of the case.

In one embodiment, the material used to make the electronic device carrying case is a soft weaved cotton, which can be water sealed with rubber cement. The cotton can reduce the heat retention of the device and the rubber cement protects the device from body moisture.

In some embodiments the case is designed to fit the size of the electronic device. In some embodiments the carrying case is designed to fit the size of the electronic device plus a protecting case.

In further embodiments, the fabrics can he leather, Gore-Tex®, plastic or other soft, water proof fabrics.

Referring now to FIG. 1, a band carrying case device for use as a personal cell phone cover worn on the back of the wrist is shown.

Referring now to FIG. 2, a band carrying case device for use as a personal cell phone cover worn on the back of the arm is shown.

Referring now to FIG. 3, a band carrying case device for use as a personal cell phone cover worn on the back of the hand is shown.

Figure 4:
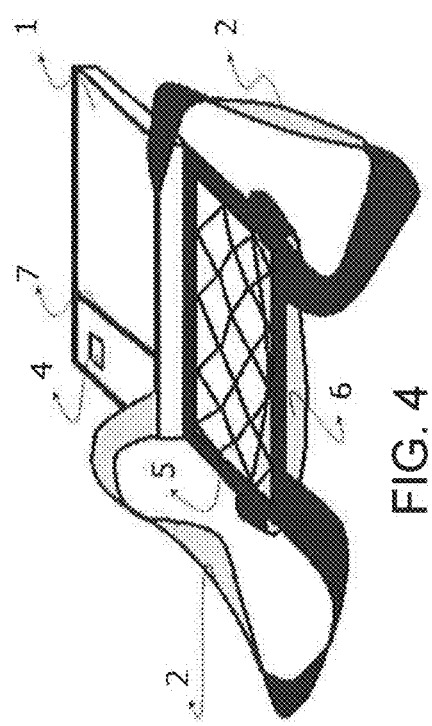
FIG. 4 illustrates a back perspective view with the cover flap opened of the personal cell phone cover as a band carrying case device of FIG. 1.

Referring now to FIG. 4, a band carrying case device for use as a personal cell phone cover is illustrated. The device includes a phone case 1 with a cover flap 5 of mesh material, and an opening for camera access 4. An optional outside of the case 1 outside storage compartment, pocket, may be accessed through an opening 7 on the inside back of the case 1. Flat personal items like credit cards, receipts etc. may he carried in the storage compartment. The back of the case 1 can be connected via, one or more arm/wrist bands 2 to the cover flap 5. The cover flap 5 top and bottom can connect via a cover flap fastening band 6 via the inside of the cover flap 5.

Referring now to FIG. 5, the figure shows an optional inside storage compartment, e.g., pocket, that may be accessed through an opening 8 on the outside back of the case 1 and four corner stoppers 3 on the open side of the case. Flat personal items like credit cards, receipts etc may be carried in the storage compartment.

Figure 6:
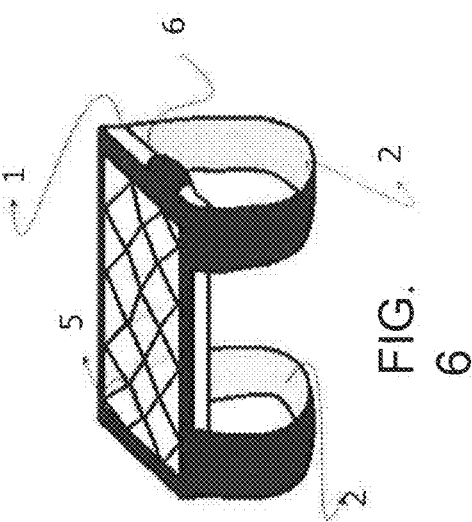
FIG. 6 illustrates a front and side perspective view with the cover flap closed and the case fastened of the personal cell phone cover as a band carrying case device of FIG. 1.

Referring now to FIGS. 6 and 7, these figures illustrate front and side perspective views of the personal cell phone cover. A band carrying case device is shown with a cover flap 5 closed and a case 1 fastened using the cover flap fastening band 6.

Referring now to FIG. 8, the figure illustrates a back perspective view of the personal cell phone cover. A band carrying case device is shown having a cover flap 5 closed and a case 1 fastened using the cover flap fastening band 6.

Referring now to FIG. 9, the figure illustrates front and side perspective views of another embodiment of the personal cell phone cover. A band carrying case device is shown having a cover flap 5 closed and a case 1 fastened using the cover flap fastening band 6. The cover flap 5 is made from a solid material. On the cover flap an extra flap 9 is attached. The extra flap 9 fastens using a magnet or Velcro® material 10. The extra flap allows easy access to the cell phone screen when opened via 11, and protects the screen when it is closed.

Figure 10:
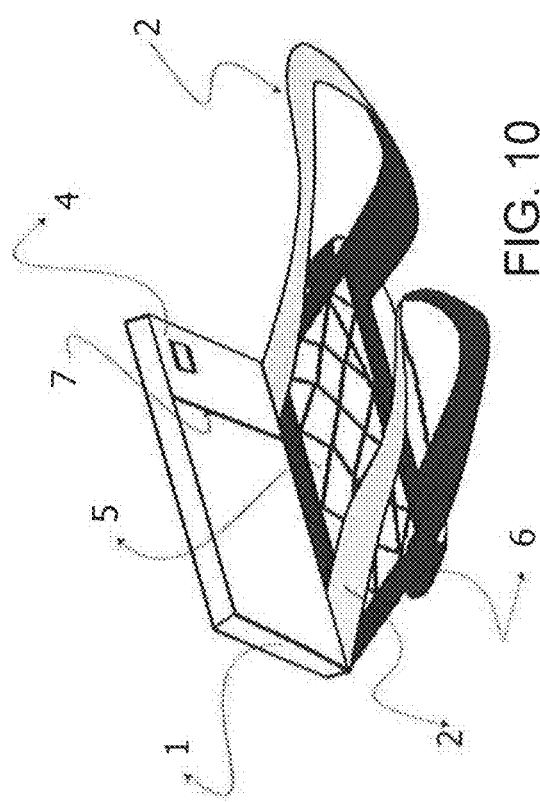
FIG. 10 illustrates back and side perspective views of the personal armband storage device of FIG. 1 as a horizontal stand.

Referring now to FIG. 10 the figure illustrates back and side perspective views of the personal cell phone cover as a horizontal stand. A band carrying case device is shown with a cover flap 5 opened and arm/wrist bands 2 reversed. The cover flap 5 and arm/wrist bands 2 are tucked under the phone for support to create a horizontal stand.

Figure 11:
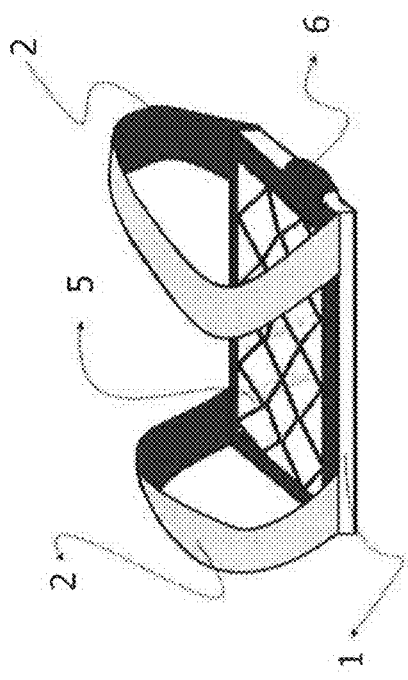
FIG. 11 illustrates front and side perspective views of the personal armband storage device of FIG. 1 with arm/wrist bands reversed.

Referring now to FIG. 11 the figure illustrates front and side perspective views of the personal cell phone cover with attaching bands 2 in reversed position. The attaching bands are positioned towards the top of the case allowing the cover flap to open by un-wrapping the cover flap fastening band 6.

Figure 12:
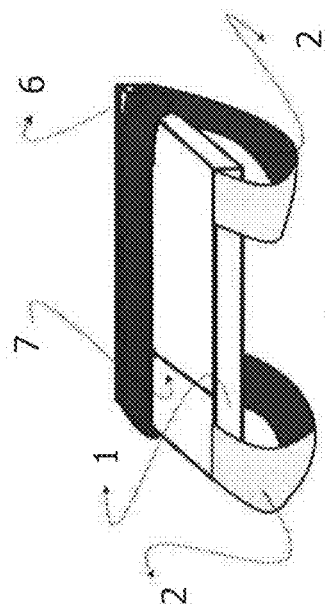
FIG. 12 illustrates back and side perspective views of the personal armband storage device of FIG. 1 with arm/wrist bands reversed.

Referring now to FIG. 12 the figure illustrates back and side perspective views of the personal cell phone cover with arm/wrist bands 2 in reversed position. The attaching bands are positioned towards the top of the case allowing the cover flap to open by un-wrapping the cover flap fastening band 6.

Figure 13:
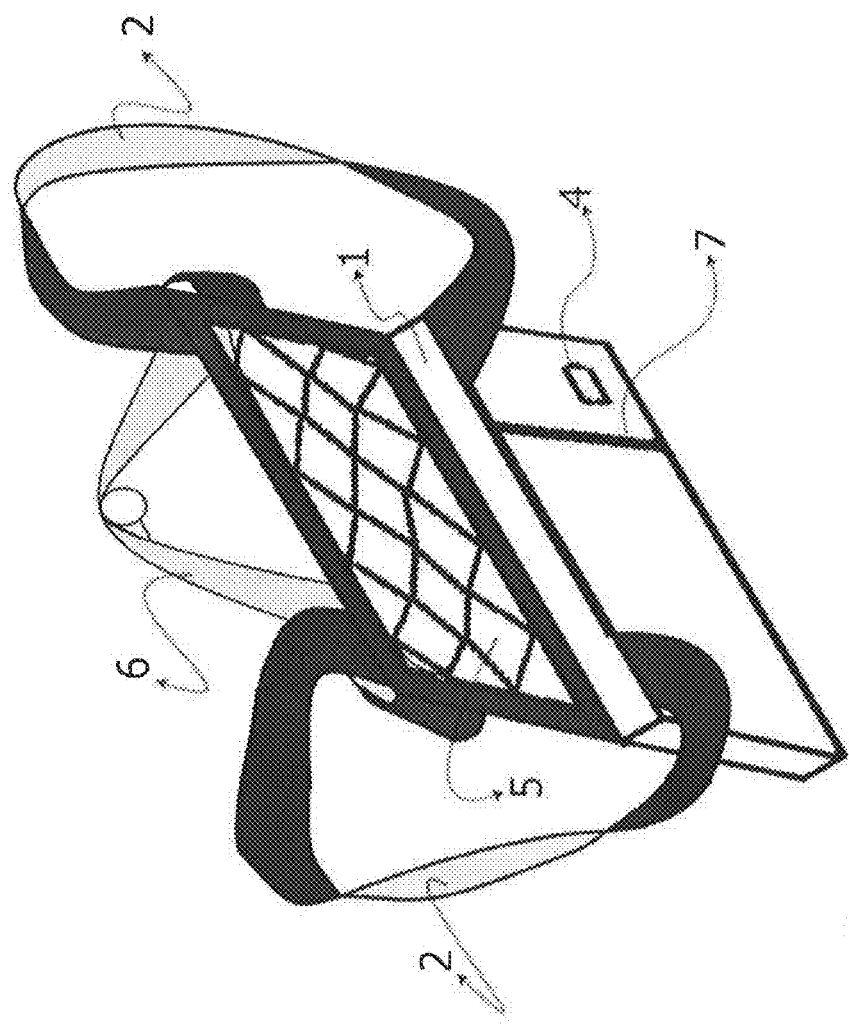
FIG. 13 illustrates a front perspective view with the cover flap opened and hanging from the cover flap fastening band of the personal cell phone cover as a band carrying case device of FIG. 1.

Referring now to FIG. 13 the figure illustrates back and side perspective views of the personal cell phone cover shown hanging using the cover flap fastening band 6.

Figure 14:
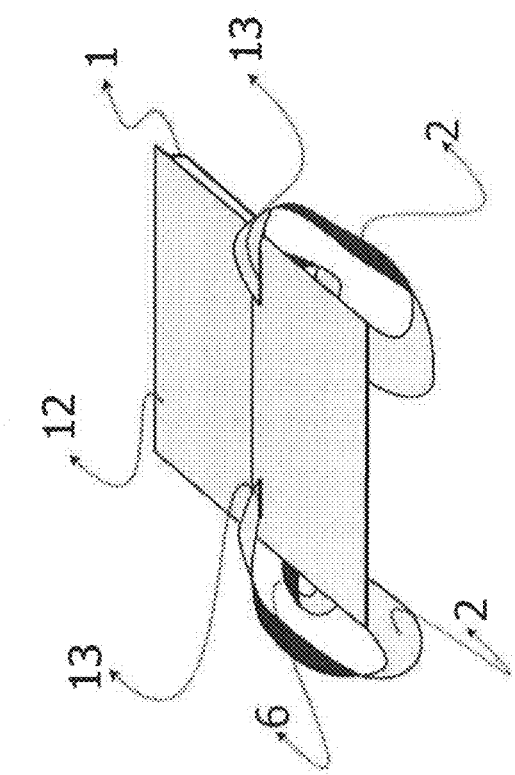
FIG. 14 illustrates a back perspective view with the cover flap opened where the cover flap extends under the whole case of the personal cell phone cover as a band carrying case device of FIG. 1.

Referring now to FIG. 14, the figure illustrates back and side perspective view of another embodiment of the personal cell phone cover. A band carrying case device is shown having a cover flap 5 opened and extending under the whole case, a case 1 is sewn or attached to the cover flap using glue or Velcro®. The cover flap 5 is made from a solid material.

Figure 15:
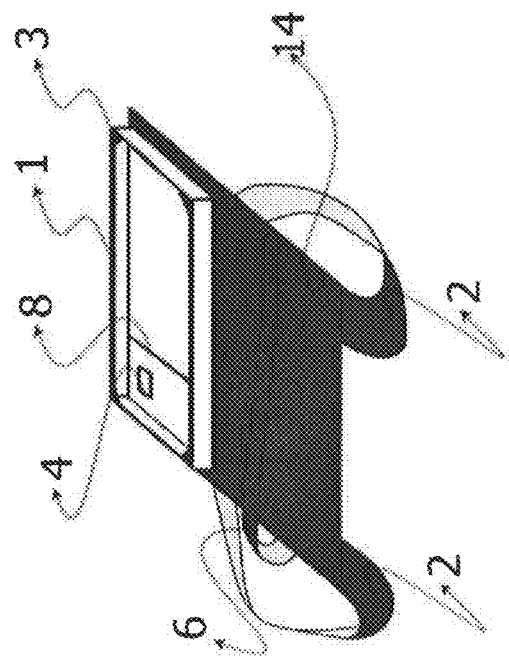
FIG. 15 illustrates a front perspective view with the cover flap opened where the cover flap extends under the whole ease of the personal cell phone cover as a hand carrying case device of FIG. 1.

Referring now to FIG. 15, the figure illustrates front perspective view of another embodiment of the personal cell phone cover. A band carrying case device is shown having a cover flap 5 opened and extending under the whole case, a case 1 is sewn or attached to the cover flap using glue or Velcro®. The cover flap 5 is made from a solid material.

Figure 16:
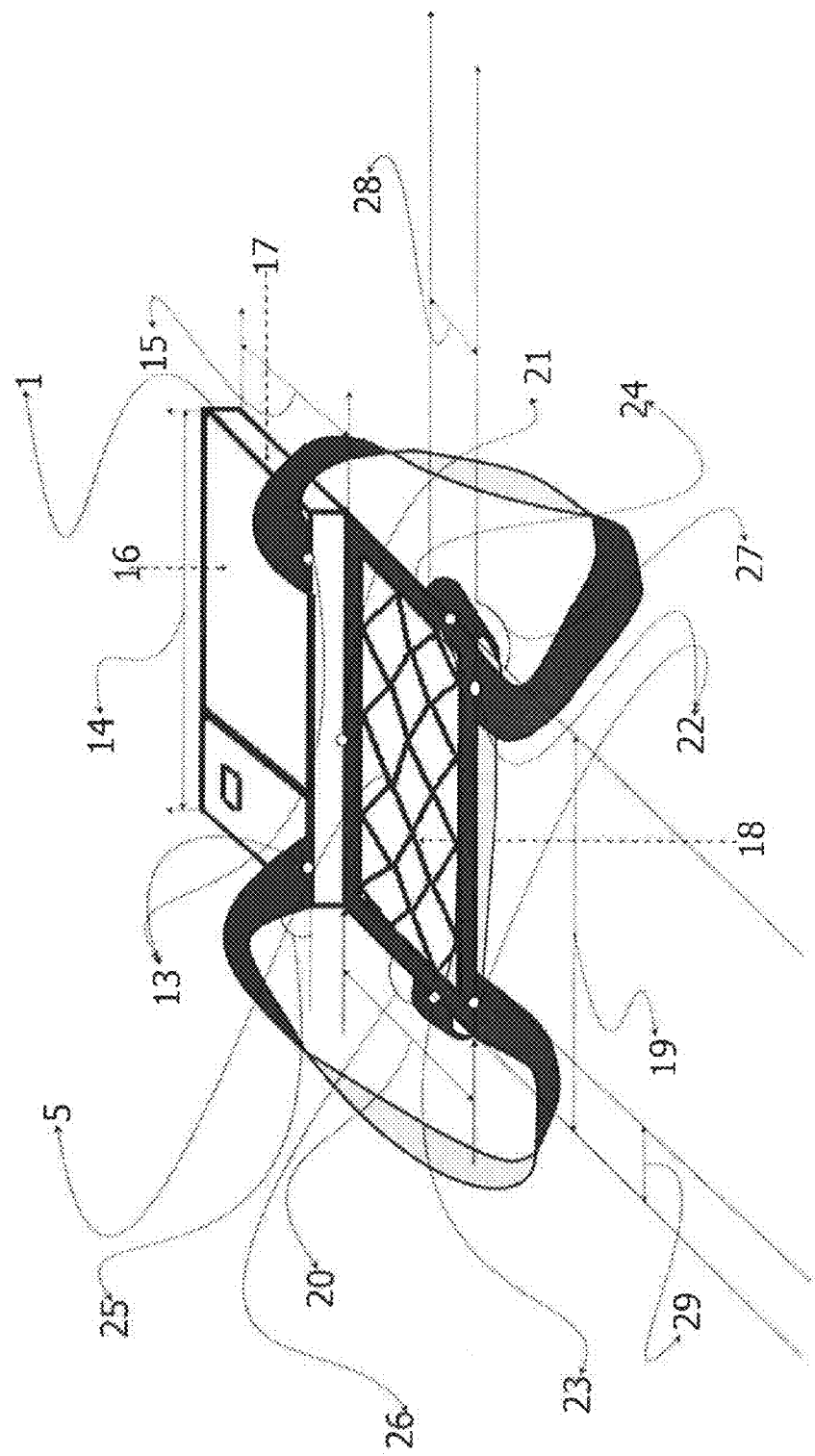
FIG. 16 illustrates a back perspective view with the cover flap opened of the personal cell phone cover as a band carrying case device of FIG. 1.

Referring now to FIG. 16, the figure illustrates back and side perspective view of the personal cell phone cover. A band carrying case device is shown having a cover flap 5 opened and a case showing back wall 16 and short length side wall 17. The cover flap attachment point 21 on one of the long lengths 14 of the case 1 and one of the long lengths of the cover flap 19. One set of Attachment points 13 of the Arm/Wrist Bands 2 are shown on one side to the corners of the back wall 16 and the long length 14 side walls of the case 1. The other set of attachment points 22 for the Arm/Wrist Bands 2 are shown to the long length 19 of the cover flap 5. Attachment point 23 for the cover flap fastening band 6 is shown on the short length 20 of the cover flap 5. The other attachment point 24 for the cover flap fastening band 6 is shown on the short length 20 of the cover flap 5 through the back of the cover flap 18. The arm/wrist bands are shown attached at one end at an angle 25 from the long length of the case and on the other end at an angle 27 from the long length of the cover flap. The attachment range of the arm/wrist bands 29 covering part of the long length 19 of the cover flap on one side or the long length 14 of the case on the other side, The cover flap fastening band attachment angle 26 to the short length 20 of the cover flap and the attachment range of the cover flap fastening band 28 to the short length 20 of the cover flap.

In another embodiment, the present disclosure relates to a carrying case and a phone cover that can be used as a stand such that the case can be hung using the cover flap fastening band and the cover flap can be open making the screen visible to the user. In another embodiment, the case can have no attaching devices, buckles or Velcro® for wearing the device on the arm or the wrist. Rather, the case has continuous arm/wrist bands that do not become unattached.

The cover flap can also be designed so that the user can access the touch screen without opening the cover flap which allows access while it is worn on the wrist or back of the hand. When the mesh openings are big enough to allow fingers to slide trough the cover flap forms a grip system for the device.

I claim:

1. An apparatus comprising
a case with a back wall and up to four side walls designed to enclose an electronic device, a cover flap with two opposing edge sides and one top side and one bottom side, at least one arm band, and at least one cover flap fastening band, wherein the cover flap is attached to the case on one edge side and on the opposite edge side to at least one arm band, wherein the cover flap is designed to allow access to the device held within the case, wherein the arm band is attached on one side to the back wall or side wall of the case and on the other side to the cover flap side edge designed to fit around a user's arm, wrist or hand, wherein the cover flap fastening band is attached to the cover flap on one side to the top of the cover flap and on the other side to the bottom of the cover flap wherein the band is designed to fit around the case and electronic device to fasten the cover flap to the case.

2. The apparatus of claim 1,
further comprising a pocket on the inside of the cover flap.

3. The apparatus of claim 1,
wherein the cover flap is designed to secure a portion of, or substantially the entire perimeter of the device and leave a substantial portion of the device within the case accessible when fastened to the case.

4. The apparatus of claim 1, is a device that can be accessed via a touch screen.

5. The apparatus of claim 1, wherein cover flap comprises a material that allows the user to access by touch a substantial front of the device.

6. The apparatus of claim 1, further comprising a pocket on the inside of the case.

7. The apparatus of claim 1, further comprising a pocket on the outside of the case.

* * * * *